(12) United States Patent
Miller (10) Patent No.: US 11,349,670 B1
(45) Date of Patent: *May 31, 2022

(54) AUTOMATED HASH VALIDATION

(71) Applicant: Garantir LLC, San Diego, CA (US)

(72) Inventor: Kieran Miller, San Diego, CA (US)

(73) Assignee: Garantir LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/367,365

(22) Filed: Jul. 4, 2021

Related U.S. Application Data (63) Continuation-in-part of application No. 17/160,345, filed on Jan. 27, 2021, now Pat. No. 11,057,215.

(51) Int. Cl.
| | | |
|---|---|---|
| *H04L 9/32* | (2006.01) | |
| *H04L 9/08* | (2006.01) | |
| *G06Q 10/08* | (2012.01) | |
| *G06F 16/245* | (2019.01) | |
| *G06F 8/41* | (2018.01) | |

(52) U.S. Cl.
CPC .............. *H04L 9/3247* (2013.01); *G06F 8/41* (2013.01); *G06F 16/245* (2019.01); *G06Q 10/0875* (2013.01); *H04L 9/0894* (2013.01); *G06Q 2220/10* (2013.01)

(58) Field of Classification Search
CPC ... H04L 9/3236; H04L 9/0894; H04L 9/3247; G06F 8/77; G06F 8/41
See application file for complete search history.

(56) References Cited

U.S. PATENT DOCUMENTS

| | | | | |
|---|---|---|---|---|
| 9,246,686 | B1* | 1/2016 | Holland | .................. H04L 63/12 |
| 2014/0279985 | A1* | 9/2014 | Fontenot | .................. G06F 8/65 |
| | | | | 707/698 |
| 2017/0180143 | A1* | 6/2017 | Zhang | ................. G06F 16/9014 |
| 2018/0205549 | A1* | 7/2018 | Blinn | ...................... H04L 63/00 |
| 2018/0349396 | A1* | 12/2018 | Blagojevic | ............ G06F 16/183 |

* cited by examiner

*Primary Examiner* — Mohammad W Reza
(74) *Attorney, Agent, or Firm* — Hickman Becker Bingham Ledesma LLP (57) ABSTRACT

Techniques for performing hash validation are provided. In one technique, a signature request that includes a first hash and a data identifier is received from a client. In response, the data identifier is identified and sent to a data repository, data that is associated with the data identifier is received from the data repository, a second hash is generated based on the data, and a determination is made whether the second hash matches the first hash. If the two hashes match, then the first hash is sent to a cryptographic device that generates a digital signature, which is eventually transmitted to the client. Alternatively, the digital signature is transmitted to the client prior to the first hash being validated. In a related technique, a server receives the signature request and sends the data identifier to a hash validator, which interacts with the data repository and generates the second hash.

20 Claims, 5 Drawing Sheets

AUTOMATED HASH VALIDATION

PRIORITY CLAIM

This application is a continuation-in-part of U.S. patent application Ser. No. 17/160,345 filed on Jan. 27, 2021, which is incorporated by reference as if fully provided herein.

TECHNICAL FIELD

The present disclosure relates generally to digital signing and, more particularly to, efficiently performing hash validation.

BACKGROUND

A digital signature is a mathematical scheme for verifying the authenticity of digital data. A valid digital signature, where the prerequisites are satisfied, provides authentication regarding the sender of a piece of data and ensures integrity regarding the contents of the data. In other words, a digital signature gives a recipient of the data strong reason to believe that the data was created by a known sender (authentication) and that the data was not altered since digitally signed (integrity).

Digital signatures may be part of one or more cryptographic protocol suites and may be used for software distribution, financial transactions, contract management, and in other cases where it is important to detect forgery or tampering.

Digital signatures employ asymmetric cryptography. In many instances, digital signatures provide a layer of validation and security to data sent through a non-secure channel. Digital signatures are analogous to traditional handwritten signatures in many respects, but properly implemented digital signatures are more difficult to forge than the handwritten type. Digital signature schemes are cryptographically based and must be implemented properly to be effective.

A digital signature scheme typically involves three algorithms:
(1) a key generation algorithm that selects a private key (e.g., at random) from a set of possible private keys. The algorithm outputs the private key and a corresponding public key;
(2) a signing algorithm that, given a message and a private key, produces a signature; and
(3) a signature verifying algorithm that, given the message, public key and signature, either accepts or rejects the message's claim to authenticity.

Two main properties are required for any digital signature scheme. First, the authenticity of a signature generated from a message and a private key can be verified by using the corresponding public key. Secondly, it should be computationally infeasible to generate a valid signature for a party without knowing that party's private key. A digital signature is an authentication mechanism that enables the creator of the message to attach a code that acts as a signature. The Digital Signature Algorithm (DSA), developed by the National Institute of Standards and Technology, is one of many examples of a signing algorithm.

Because the digital signature scheme involves generating a signature based on a piece of data, the time to generate the signature is proportional to the size of that data. Thus, the greater the number of bytes, the greater the time required to generate the signature. Another time consideration in generating a signature is the location of the hardware (referred to herein as a "cryptographic device") that stores the private key and generates the signature. If the cryptographic device is located remotely from the client that is requesting the signature, then the time to transmit the piece of data over a network (whether local or wide area) can be significant. Therefore, the size of the data that is to be digitally signed may have a significant impact on performance of the overall data distribution system that is responsible for making the data available to a consumer of the data, whether the consumer is a single recipient or the general public.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, some structures and devices are shown in block diagram form in order to avoid unnecessarily obscuring the present invention.

Code Signing

One example type of data that may be digitally signed is software code, such as compiled code that a compiler generates based on human-readable source code written in a programming language, such as Java, Python, Perl, or C++. Compiling source code entails converting a program (written in one or more source code files) into machine code or a lower level form in which the program may be executed. Digital signatures for such code are required in certain instances. For example, in order for a software application to be made available in an online application store (e.g., Apple's AppStore for iOS applications or Google's Play Store for Android applications), the software application must be digitally signed. A digital signature of a software application allows the online application store to verify that the software application was produced by a verifiable entity. As another example, an anti-virus policy for a server or computing device of an end-user may require that a program must be signed by one or more known trusted entities before the program is executed on the server/device.

Hash Signing

One approach for reducing the amount of time required to digitally sign a piece of data, such as compiled code of a large software program, is to digitally sign a hash of the data, rather than signing the data itself. This is referred to as "hash signing." The data (e.g., an executable file) is input to a hash function that produces a hash value (or "hash") of a fixed size (e.g., 128 bits), regardless of the size of the data. Transmitting a hash over a network and signing the hash is much faster than transmitting and signing a large file.

One downside to hash signing is that the entity or party signing the hash cannot guarantee the authenticity of the data that the hash represents (or from which the hash derives). The entity might be able to authenticate the party providing the hash, but there is a chance that the data was compromised before it was hashed. It is possible that an individual stole authentication credentials and sends a malicious hash pretending that the hash came from a valid user. It is also possible that the user is valid, but the user is acting maliciously (e.g., as a compromised employee).

In other words, there is no way to distinguish between a good hash and a bad hash from just the hash alone. While there are ways to authenticate the user or client requesting a signature for a hash, authorize the request, log any activities related to the request, and notify certain parties in case a problem arises, there is no way to know whether a valid user is attempting to obtain a digital signature for something malicious. One way to address this problem is a manual approval process that is triggered when a digital signature is requested and involves notifying one or more people to approve a hash before a signature is generated. While this approval process is effective in low volume, high security use cases (e.g., quarterly production releases), this process is not effective in moderate-to-high volume use cases (e.g., continuous integration environments or non-publication environments). Indeed, the manual approval process is not practical for customers who frequently request signatures, such as hundreds or thousands of signatures per day.

General Overview

A system and method for performing hash validation are provided. In one technique, a server receives, from a client requesting a digital signature, a signing request that includes a hash. The hash was generated based on a data item, such as compiled code or an email. The server provides a data identifier of the data item to a hash validator, which uses the data identifier to retrieve the data item from a data repository. The hash validator generates a hash based on the retrieved data item and returns the hash to the server. The server compares (1) the hash from the client to (2) the hash from the hash validator. If the hashes match, then the hash from the client is validated; otherwise, the hash from the client is invalidated.

In one technique, the server returns a digital signature to the client only after validating the hash from the client. This is referred to herein as "pre-sign hash validation." In another technique, the server returns the digital signature to the client without first validating the hash from the client. Instead, the server performs hash validation after the requested digital signature is sent to the client. This is referred to herein as "post-sign hash validation." In this way, the time to obtain a digital signature for a hash is reduced significantly while still validating a hash.

In a related technique, a build process to build a software package is modified to include both code signing and parallelization of one or more steps or elements of the build process. For example, while code signing or some steps of the build process (e.g., unit testing) are being performed, other elements of the build process are performed in parallel, such as static code analysis and binary code analysis. This is possible because multiple copies of the source code files have been retrieved and compiled. In this way, the build process occurs in less time.

System Overview

Figure 1:
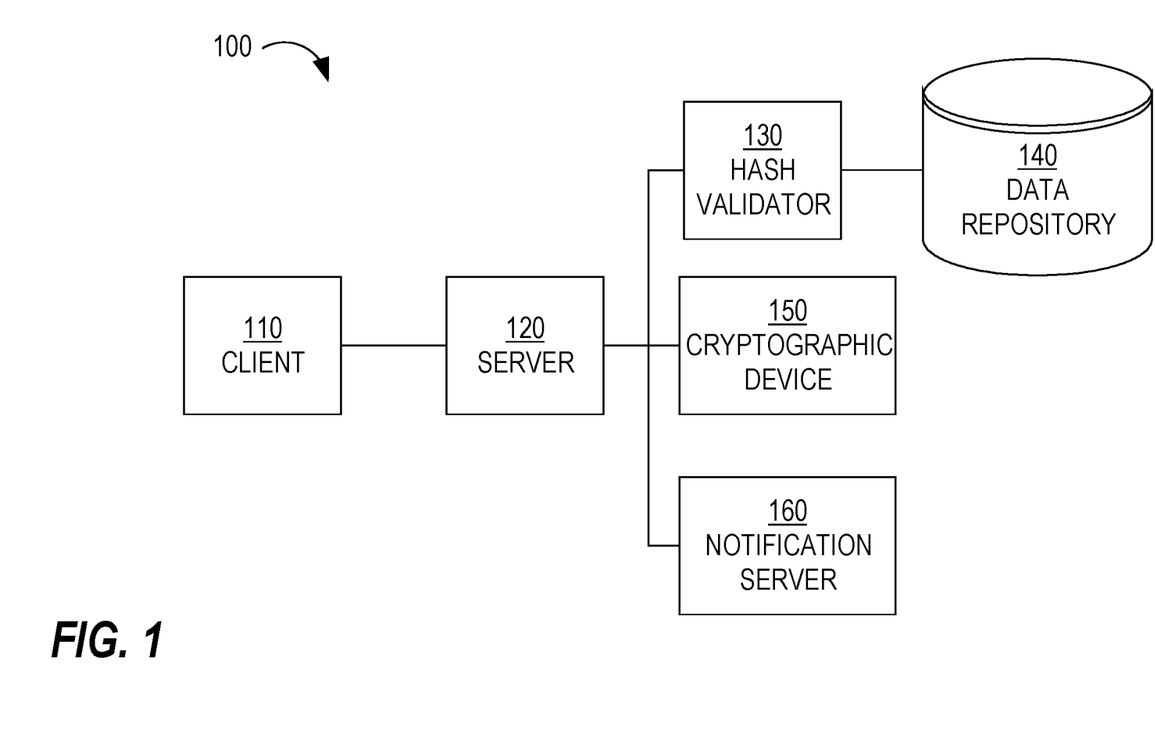
FIG. 1 is a block diagram that depicts an example system for performing hash validation, in an embodiment.

FIG. 1 is a block diagram that depicts an example system 100 for performing hash validation, in an embodiment. System 100 includes a client 110, a server 120, a hash validator 130, a data repository 140, a cryptographic device 150, and a notification server 160. These elements or components of system 100 may reside in different networks or in the same network. For example, system 100 is implemented in the same physical site (or premises) owned by a particular entity (e.g., a company) that requests digital signatures. As another example, system 100 is implemented in a virtual private cloud (VPC) that is part of a third-party cloud service, but that is dedicated to a single entity (e.g., a company) that requests digital signatures. Alternatively, some elements of system 100 may be implemented on a company's premises and other elements of system 100 may be implemented in a VPC that is dedicated to supporting the company.

Client 110 is software that executes on a computing device and is configured to communicate with server 120. Client 110 is communicatively coupled to server 120 over a computer network (not depicted). Examples of such a network include a local area network (LAN), a wide area network (WAN), and the Internet. Although only one client is depicted, system 100 may include multiple clients that are communicatively coupled to server 120. In the case of multiple clients, a load balancer may sit between server 120 (which may include multiple servers) and the multiple clients. The load balancer balances signature requests (from the multiple clients) among multiple servers such that each server has approximately the same load (e.g., as measured by the number of signature requests each server is currently processing).

In an embodiment, client 110 includes specialized software or code that executes on a computing device to communicate with server 120. The specialized software or code is separate from application code that executes on client 110 and that includes separate business logic pertaining to task(s) client 110 is intended to perform. An example of client 110 is a build server that takes part in the build process to create, from source code, one or more executables of a software program. Another example of client 110 is a word processing application that allows for the digital signing of electronic documents, where a master copy of an electronic document is stored in a central document repository. Another example of client 110 is a computing device operated by a single person who directly requests a digital signature for a piece of data, such as application code.

Client 110 generates a hash for certain data for which an operator of client 110 wishes to ensure authentication and integrity. Client 110 relies on (e.g., implements) one or more hashing algorithms or techniques to generate a hash based on a piece of data. Examples of such data include source code of a software program, a document (e.g., a text document or a PDF (portable document format) document), an email, and a file, such as a file containing executable code (or binary code) and/or media data, such as video data and audio data.

Client 110 generates and transmits, to server 120, a signature request that includes a hash and one or more parameters. Client 110 uses one or more techniques to communicate with server 120. One example technique is using a RESTful API, which is an application programming interface that uses HTTP requests to GET, PUT, POST, and DELETE data. A RESTful API is based on representational state transfer (REST) technology, which is an architectural style and approach to communications used in web services development.

Server 120 is responsible for providing a digital signature to client 110 (and, potentially, other clients, not depicted) upon receiving a signature request from client 110. Server 120 may be implemented on one or more computing devices that are separate from the computing device upon which client 110 executes. As noted above, system 100 may include multiple instances of server 120 that are able to process signature requests from one or more instances of client 110. The multiple instances may be implemented on one or more computing devices.

In response to receiving a signature request, server 120 sends the hash to a cryptographic device 150, which selects a private key, generates a digital signature based on the private key and the hash, and returns the digital signature to server 120. As described in more detail below, server 120 may send the hash to cryptographic device 150 before or after validating the hash from client 110. Server 120 sits in between cryptographic device 150 and client 110, thus, hiding the complexity of client 110 having to interact directly with cryptographic device 150.

Hash validator 130 is responsible for generating a hash based on a data item retrieved from data repository 140. In an embodiment, hash validator 130 is implemented as part of server 120; thus, there is no code boundary between server 120 and hash validator 130. In another embodiment, hash validator 130 is separate from, but communicatively coupled to, server 120. In this embodiment, while server 120 may provide the hash from client 110 to hash validator 130 to allow hash validator 130 to compare both hashes, in order to increase security in system 100, server 120 might not share, with hash validator 130, the hash from client 110. In this embodiment where hash validator 130 is separate from server 120, hash validator 130 may execute on the same computing device as server 120 or may execute on a different (or separate) computing device than the one upon which server 120 executes.

Thus, in this embodiment, hash validator 130 sends, to server 120, the hash that hash validator 130 generates based on the data item retrieved from data repository 140. Server 120 then performs hash validation by comparing the hash from client 110 with the hash from hash validator 130. If the hashes match, then the hash from client 110 is validated. If the hashes do not match, then the hash from client 110 is not validated.

In cases where the hash is validated (or even in cases where the hash is eventually not validated, as described in more detail herein), client 110 receives a digital signature in response to its signature request. Client 110 bundles the digital signature into a file (e.g., that includes compiled code or a file that is separate from the one whose hash is being signed) in a proprietary format and stores or transmits the file, such as to an online application store. Also, in response to a successful validation, server 120 may trigger an auditable security action, such as logging the event, sending one or more notifications, or uploading, to an online directory, the matched artifacts (e.g., a compiled binary) from which the hashes were generated.

If server 120 determines that the hash received from client 110 is invalid, then server 120 performs or triggers the performance of one or more security-related actions or activities, such as logging the invalidation, notifying one or more interested parties (e.g., via text or email), blocking a user associated with client 110 from utilizing the services of server 120, at least temporarily, or refraining from using the corresponding private key for a certain time period. In the latter action, server 120 may instruct cryptographic device 150 to not use that private key for a certain time period or indefinitely. Additionally or alternatively, server 120 stores prevention data that server 120 (and any other instances of server 120) uses in determining whether to respond to future signature requests (that indicate the same private key) from client 110 and/or other clients.

Data repository 140 stores data upon which a hash is based. Data repository 140 may be a file system or a database system. Examples of a database include a relational database, an object-oriented database, a NoSQL database, and a NewSQL database. An example of a data repository is a source code repository that stores source code files of one or more software applications. Examples of a source code repository include Git, Bazaar, and Mercurial. Data repository 140 may comprise a single storage device or multiple storage devices.

Cryptographic device 150 is a device that stores one or more private keys and that is accessible to server 120. Examples of cryptographic device 150 include a key manager, a hardware security module (HSM), and a software-based keystore. Cryptographic device 150 may be remote or local relative to server 120, which does not have direct access to the keys stored by cryptographic device 150, making system 100 secure. For example, cryptographic device 150 may be a software keystore that is implemented on the same computing device as client 110.

If cryptographic device 150 stores multiple private keys, then each key may be associated with a different key identifier (ID). Thus, a signature request from server 120 may include a key ID, which may have originated in the corresponding signature request that server 120 received from client 110.

Although system 100 depicts only one cryptographic device 150, system 100 may include multiple cryptographic devices that store keys for generating digital signatures for client 110. In other words, the client 110 may, at different times, request digital signatures generated using different keys that are stored in different cryptographic devices.

Notification server 160 is a server that generates and sends notifications. Such notifications may be sent in response to hash validation failures and, optionally, successes. Notification server 160 may determine an intended recipient of a notification based on recipient identification data included in a message from server 120 or based on other data included in a message from server 120. For example, server 120 stores a mapping that maps client 110 (and/or a key) to a set of one or more individuals (or their respective contact information, such as an email or phone number). If a hash validation failure occurs with respect to client 110 (or the key), then server 120 uses the mapping to identify the appropriate recipient. Alternatively, such a mapping is maintained at, and used by, notification server 160. Although only one notification server is depicted, system 100 may include multiple notification servers, each configured to perform the same functions.

System 100 may include other elements that are not depicted, such as (1) one or more administrative servers that allow administrators to perform certain duties (e.g., user management, key management) and (2) a message broker that allows server 120, any administrative servers, hash validator 130, and notification server 160 to communicate.

Hash Validation

As described herein, server 120 (and, optionally, one or more other elements of system 100 interacting with server 120) performs hash validation on a hash received from client 110. Hash validation involves verifying whether the hash received from client 110 is a valid (or "good") hash.

A signature request from client 110 to server 120 includes a hash and a data identifier that identifies a data item upon which the hash is based. In the context of signing code, the data item is a set of one or more source code files and the data identifier is a source revision number. In the context of signing an electronic document, the data item is the electronic document and the data identifier is a document identifier, such as a URL or a path name that uniquely identifies a logical storage location of the document. If cryptographic device 150 stores multiple keys, then the signature request may also include a key ID that uniquely identifies one of the keys. The signature request may also include data that identifies which hashing algorithm was used to produce the hash, as well as parameters of the hashing and signature algorithms. Such parameters are used for one or more reasons. For example, in certain cases (e.g., RSA signing) the hash is prepended with an algorithm identifier before signing. This prepending may be performed server-side, in which case the hash algorithm used needs to be known. As another example, in order to validate a hash independently, the hash algorithm needs to be known. As another example, the identity of the hashing algorithm may be used for future auditing purposes As described herein, server 120 may perform hash validation before sending a requested digital signature to client 110 or may perform hash validation after sending the requested digital signature to client 110. The latter is referred to as "post-sign hash validation" and the former is referred to as "pre-sign hash validation," each of which is described in more detail herein.

Pre-Sign Hash Validation

Figure 2:
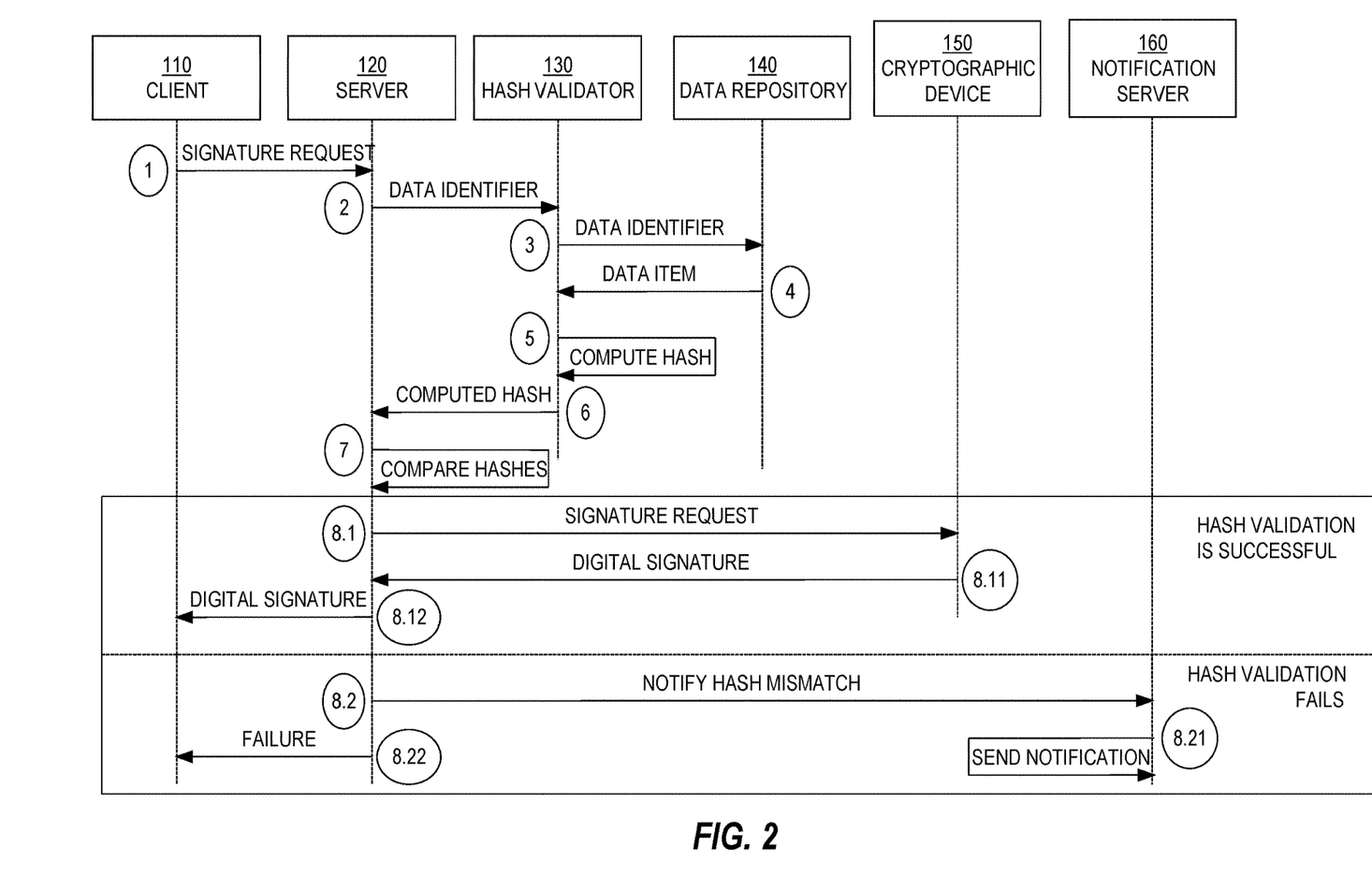
FIG. 2 is a sequence diagram depicting communications among different elements of a signing system to implement pre-sign hash validation, in an embodiment.

FIG. 2 is a sequence diagram depicting communications among different elements of system 100 to implement pre-sign hash validation, in an embodiment. Because no digital signature is provided to client 110 unless the hash from client 110 is validated, pre-sign hash validation is considered a preventative control. It provides strong security, but is less performant than post-sign hash validation, particularly in scenarios where the data that is hashed is relatively large and/or it takes a significant amount of time to retrieve and/or generate the data. Pre-sign hash validation is ideal for production scenarios, such as where the digital signatures are publicly-trusted signatures. A publicly-trusted signature is one that corresponds to a certified public key, i.e., that is certified by a certificate authority (a trusted third-party) that issues a digital certificate that certifies the ownership of a public key by the named subject of the certificate. The digital certificate allows others (relying parties) to rely upon digital signatures or on assertions made about the private key that corresponds to the certified public key.

Although each step in the sequence diagram may imply a single computing step, each step may involve multiple computing steps. Also, the termination of a vertical dotted line attached to an element of system 100 does not mean the corresponding element ceases to function. The vertical dotted line terminations are for readability and interpretability of FIG. 2 only.

At step 1, client 110 sends a signature request to server 120. The signature request includes a hash and one or more signature parameters, such as a data identifier, a key ID, and an indication of the hashing algorithm that client 110 (or other program/software) used to generate the hash. Step 1 may involve composing a message, including the signature request in that message, and transmitting the updated message (e.g., over a computer network) to server 120. Examples types of messages include a HTTP GET message and a gRPC message.

At step 2, server 120 retrieves the data identifier from the signature request and sends the data identifier to hash validator 130. In an embodiment, server 120 does not send the hash to hash validator 130. Rather, server 120 does not share the hash with any other computing entity. The message sent to hash validator 130 may also include an indication of which hashing algorithm was used. If only one hashing algorithm is supported by client 110 (and any other clients that might send signature requests to server 120), then such an indication is not needed.

At step 3, hash validator 130 sends a data item request to data repository 140. The data item request includes the data identifier. Similar to step 2, step 3 may involve composing a message (e.g., an HTTP GET message), including the data identifier in that message, and transmitting the updated message (e.g., over a computer network) to data repository 140. In the context of code signing, the data identifier may be a source revision number that uniquely identifies a certain version of software.

At step 4, based on the data item request, data repository 140 uses the data identifier to retrieve the data item and send the data item to hash validator 130. Step 4 may involve generating a message (e.g., an HTTP response message) that specifies a destination identifier that identifies hash validator 130 and that includes the data item.

At step 5, hash validator 130 computes a hash, using a hashing algorithm, of the data item retrieved from data repository 140. The hashing algorithm that hash validator 130 uses may be selected based on a hashing algorithm indicated in the message from server 120 to hash validator 130. Thus, different signature requests from one or more clients may indicate different hashing algorithms. As a result, hash validator 130 may implement, or have access to, multiple hashing algorithms.

In the context of code signing, the data item is a set of source code files and step 5 first involves compiling the source code retrieved from data repository 140, which is a source code repository in this context. The hash is then generated based on the compiled code (e.g., assembly code, object code, or machine code). Thus, in this context, hash validator 130 includes a compiler.

At step 6, hash validator 130 sends the computed hash to server 120.

At step 7, server 120 compares the hash from hash validator 130 with the hash from client 110 (received as a result of step 1). The comparison may be a byte-by-byte comparison. If there is any byte or bit that is different between the two hashes, then hash validation fails; otherwise, hash validation succeeds. Successful hash validation results in steps 8.1-8.12, whereas failed hash validation results in steps 8.2-8.22.

At step 8.1, in response to determining that the hash from client 110 is valid, server 120 generates and sends a signature request to cryptograph device 150. The signature request includes the hash from client 110 (or from hash validator 130) and may include a key identifier if cryptographic device 150 stores multiple keys and it is not clear from the context (e.g., the identity of client 110 or of a user of client 110 who initiated the original signature request) which key to use.

At step 8.11, cryptographic device 150 uses the hash and the appropriate private key to generate a digital signature. Step 8.11 also involves cryptographic device 150 sending the digital signature to server 120.

At step 8.12, server 120 forwards, to client 110, the digital signature from cryptographic device 150.

At step 8.2, in response to determining that the hash from client 110 is invalid, server 120 generates and sends, to notification server 160, a message that indicates that there was a mismatch between the two hashes. At step 8.21, notification server 160 sends one or more notifications to one or more intended recipients. Example notifications may include a text (or SMS) message, an email, or an in-app notification.

In a related embodiment, steps 8.1 and 8.11 are performed before step 2, concurrently with step 2, or immediately after step 2 (e.g., at least before step 7). In this way, upon successful hash validation, step 8.12 (transmitting the digital signature to client 110) may be performed immediately without initiating steps 8.1 and 8.11 only after step 7. This embodiment is useful in scenarios where the time to perform steps 8.1 and 8.11 is not trivial compared to the time to perform steps 2-7.

Post-Sign Hash Validation

Figure 3:
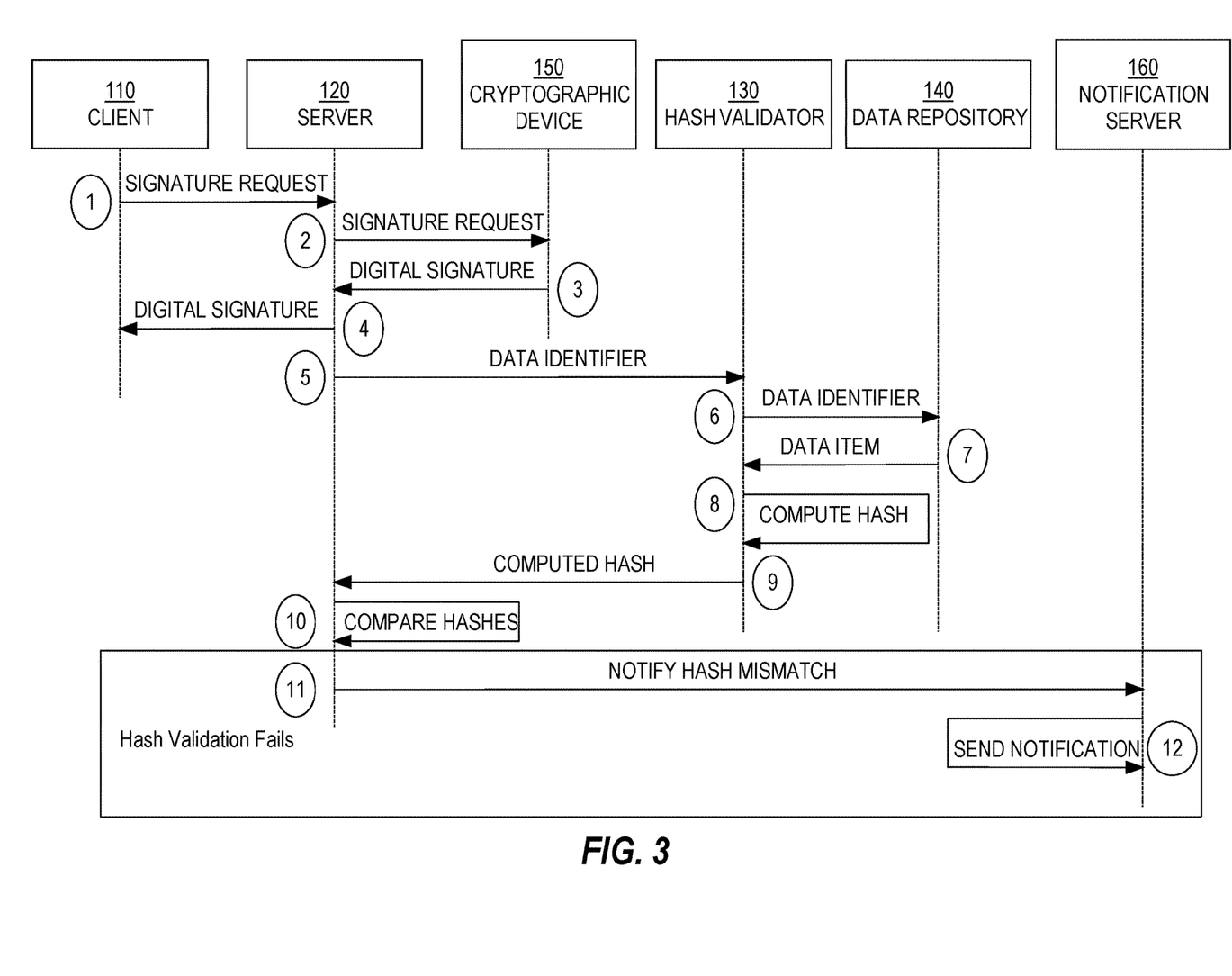
FIG. 3 is a sequence diagram depicting communications among different elements of a signing system to implement post-sign hash validation, in an embodiment.

FIG. 3 is a sequence diagram depicting communications among different elements of system 100 to implement post-sign hash validation, in an embodiment. Because a digital signature is provided to client 110 before the hash from client 110 is validated, post-sign hash validation is considered a detective control. Post-sign hash validation provides high performance but is less secure because there is a risk that the hash from client 110 is invalid. However, the risk is minimized because the time required to detect the invalid hash is roughly equal to the time that it takes to perform the main steps of hash validation. Post-sign hash validation is ideal for non-production scenarios, such as where the digital signatures are internally-trusted signatures, not publicly-trusted signatures. However, if an attacker compromises a non-production key, then the attacker may be able to compromise a non-production build server, which may allow the attacker to compromise other elements in the network. Therefore, hash validation is still important in the non-production scenario.

Again, although each step in the sequence diagram may imply a single computing step, each step may involve multiple computing steps. Also, the termination of a vertical dotted line attached to an element of system 100 does not mean the corresponding element ceases to function. The vertical dotted line terminations are for readability and interpretability of FIG. 3 only.

At step 1, client 110 sends a signature request to server 120. Step 1 of FIG. 3 is similar to step 1 of FIG. 2.

At step 2, in response to receiving the signature request from client 110, server 120 generates and sends a signature request to cryptograph device 150. The signature request includes the hash from client 110 and may include a key identifier if cryptographic device 150 stores multiple keys and it is not clear from the context (e.g., the identity of client 110 or of a user of client 110 who initiated the original signature request) which key to use. Thus, step 2 of FIG. 3 is similar to step 8.1 of FIG. 2.

At step 3, cryptographic device 150 uses the hash and the appropriate private key to generate a digital signature. Step 3 also involves cryptographic device 150 sending the digital signature to server 120. Thus, step 3 of FIG. 3 is similar to step 8.11 of FIG. 2.

At step 4, server 120 forwards, to client 110, the digital signature from cryptographic device 150. Thus, step 4 of FIG. 3 is similar to step 8.12 of FIG. 2.

At step 5, server 120 retrieves the data identifier from the signature request received from client 110 and sends the data identifier to hash validator 130. Thus, step 5 of FIG. 3 is similar to step 2 of FIG. 2.

At step 6, hash validator 130 sends a data item request to data repository 140. The data item request includes the data identifier. Thus, step 6 of FIG. 3 is similar to step 3 of FIG. 2.

At step 7, based on the data item request, data repository 140 uses the data identifier to retrieve the data item from storage and send the data item to hash validator 130. Thus, step 7 of FIG. 3 is similar to step 4 of FIG. 2.

At step 8, hash validator 130 computes a hash using a hashing algorithm on the data item retrieved from data repository 140. Thus, step 8 of FIG. 3 is similar to step 5 of FIG. 2.

At step 9, hash validator 130 sends the computed hash to server 120.

At step 10, server 120 compares the hash from hash validator 130 with the hash from client 110 (received as a result of step 1). Thus, step 10 of FIG. 3 is similar to step 7 of FIG. 2. If the hashes match, then the hash from client 110 is validated and the process ends. No further steps are necessary (other than, possibly, storing a log entry indicating a successful hash validation) because the digital signature has already been generated and sent to client 110. However, other steps may be taken in this positive validation scenario, such as generating and sending a notification or another triggerable process. If the hashes do not match, then the process proceeds to step 11.

At step 11, in response to determining that the hash from client 110 is invalid, server 120 generates and sends, to notification server 160, a message that indicates that there was a mismatch between the two hashes. At step 12, notification server 160 sends one or more notifications to one or more intended recipients. Steps 11 and 12 of FIG. 3 are similar to, respectively, steps 8.2 and 8.21 of FIG. 2.

Mode Selection

In an embodiment where both modes of hash validation are supported, a particular mode may be selected in one or more ways. For example, the mode may be determined based on the key ID that is included in the signature request from client 110. In this embodiment, at least one key is associated with only one mode. A cryptographic device that stores that key may store another key that may be used in both modes. As another example, the mode may be determined based on a mode ID included the signature request. A mode may be selected based on one or more other external factors, such as the time of day and the number of signatures already produced during a specified time frame.

Therefore, server 120 may operate in (1) a pre-sign hash validation mode for one signature request and (2) a post-sign hash validation mode for another signature request. The processing of such signature requests may occur sequentially or concurrently.

Build

In software development, "build" may refer to either the process of converting source code files into standalone software artifact(s) that can be run on one or more computing devices, or the result of doing so. The build process is usually managed by a build tool or program that coordinates and controls other programs. Examples of a build tool are make, Gradle, Ant, Maven, Rake, SCons, and Phing. The build tool compiles one or more source code files in a particular order.

Figure 4A:
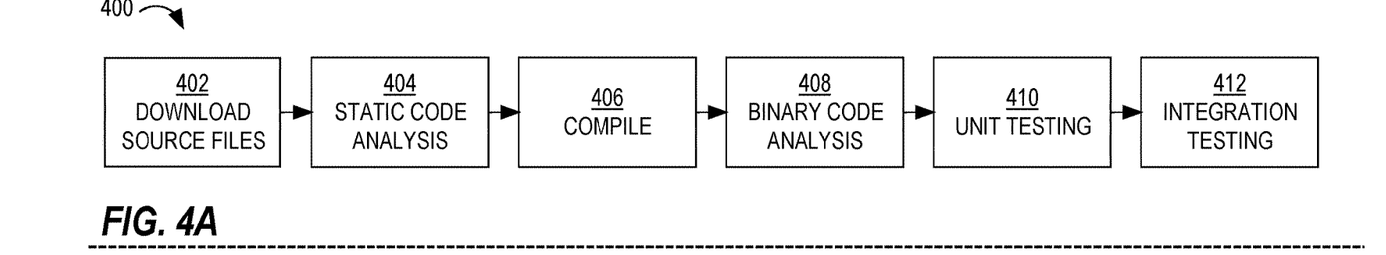
FIG. 4A is a flow diagram that depicts an example build process that does not involve code signing.

FIG. 4A is a flow diagram that depicts an example build process 400 that does not involve code signing. Build process 400 includes multiple compilation-related activities, such as one or more pre-compilation activities and/or one or more post-compilation activities. Build process 400 includes downloading source code 402, performing static code analysis 404, compiling 406, performing binary code analysis 408, unit testing 410, and integration testing 412. Downloading source code 402 and static code analysis 404 are examples of pre-compilation activities. Binary code analysis 408, unit testing 410, and integration testing 412 are examples of post-compilation activities. Build process 400 may include other steps or types of testing, such as validation testing and system testing, both of which are examples of post-compilation activities. Alternatively, build process 400 includes fewer of these compilation activities.

Static code analysis 404 is the analysis of computer software that is performed without actually executing a program. In some cases, static code analysis 404 is performed on some version of the source code, and in the other cases, some form of the object code. Compiling 406 is implemented using a compiler, which is a computer program that translates computer code written in one programming language (e.g., C++) into another language, such as assembly code or binary code.

Binary code analysis 408 is the analysis of binary code that is produced from compiling source code. Binary code analysis 408 may involve threat assessment and vulnerability testing at the binary code level. Additionally, binary code analysis 408 may be used to analyze third-party libraries, allowing a richer analysis and better visibility into how applications will interact with libraries.

Unit testing 410 is a software testing method by which individual units of source code, sets of one or more computer program modules together with associated control data, usage procedures, and/or operating procedures are tested to determine whether they are fit for use. Unit tests are typically automated tests written and run by software developers to ensure that a section of an application (known as the "unit") meets its design and behaves as intended. In procedural programming, a unit may be an entire module, but a unit is more commonly an individual function or procedure. In object-oriented programming, a unit is often an entire interface, such as a class, but could be an individual method.

Integration testing 412 is a phase in software testing in which individual software modules are combined and tested as a group. Integration testing 412 is conducted to evaluate the compliance of a system or component with specified functional requirements. Integration testing 412 may occur after unit testing 410 and before validation testing (not depicted). Integration testing 412 (1) takes, as input, modules that have been unit tested, (2) groups them in larger aggregates, (3) applies tests defined in an integration test plan to those aggregates, and (4) delivers, as output, the integrated system ready for validation testing or system testing.

If static code analysis 404, binary code analysis 408, unit testing 410, and integration testing 412 complete without any errors or any significant errors, then the build is complete (unless build process 400 includes other testing that must complete first, such as validation testing and system testing). Examples of significant errors include a compilation error, a linker error, a name resolution error, and a fatal error (where the executable crashes).

Figure 4B:
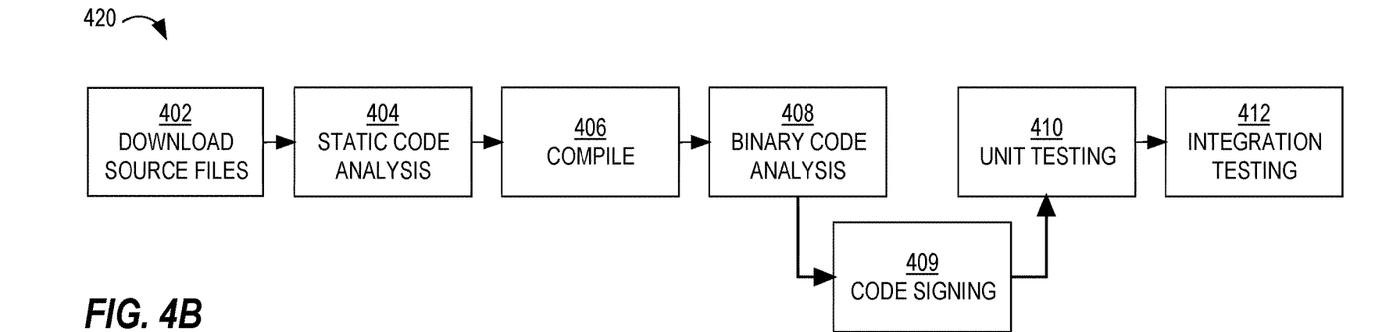
FIG. 4B is a flow diagram that depicts an example build process that involves code signing.

FIG. 4B is a flow diagram that depicts an example build process 420 that involves code signing. Build process 420 includes the same compilation-related activities of build process 400 (i.e., downloading source code 402, performing static code analysis 404, compiling 406, performing binary code analysis 408, unit testing 410, and integration testing 412), as well as code signing 409. In build process 420, adding code signing 409 to the build process necessarily increases the time to generate the resulting build. To reduce the time to complete code signing 409, post-sign hash validation may be implemented. In this way, unit testing 410 may begin as soon as a digital signature is available for the compiled code.

Reducing Build Time with Code Signing

Figure 4C:
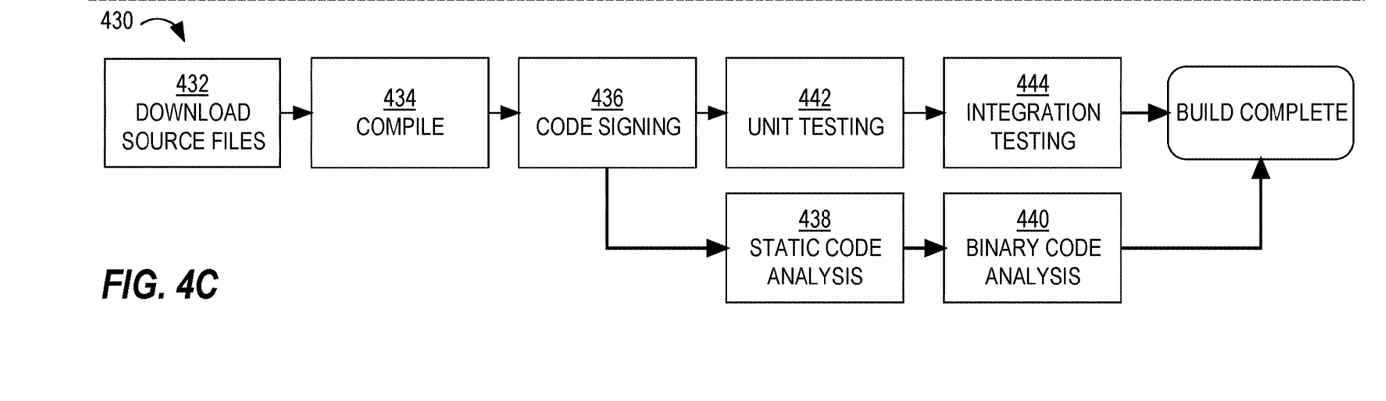
FIG. 4C is a flow diagram that depicts an example build process that involves code signing and parallelizing certain parts of the build process, in an embodiment.

The time to complete build process 420 may be reduced even further over build process 400, despite including code signing in the process. FIG. 4C is a flow diagram that depicts an example build process 430 that involves code signing and parallelizing certain parts of the build process, in an embodiment.

Build process 430 may be triggered in one or more ways. For example, a software developer provides input to commit code to a source code repository, which triggers build process 430. A process on the same device as client 110 may have received the input to commit the code, which causes a message to be sent to client 110 to generate and send a signature request to server 120, which begins code signing 436. As another example, an individual in a "release manager" role can trigger the build. Any build may be triggered either manually by a person or automatically by a predefined process.

Build process 430 may include some of the same steps as build processes 400 and 420, except in a different order. For example, build process 430 includes downloading source code 432, compiling 434, code signing 436, performing static code analysis 438, performing binary code analysis 440, unit testing 442, and integration testing 444. Once each of integration testing 444 and binary code analysis 440 are finished, the build (at least in this example that does not involve other types of testing, such as validation testing and system testing) is complete, unless one or more certain types of errors have been detected. Some types of errors may be fatal, meaning that the build is not considered complete if at least one of those types of errors is detected during the testing/analysis. Other types of errors are not fatal, meaning that the build is still considered complete even if multiple instances of these types of errors are detected during testing/analysis.

In this example, static code analysis 438 and binary code analysis 440 are performed in parallel to unit testing 442 and integration testing 444. This is possible because there are two versions of the source code files: one version at, for example, client 110, and the other version at hash validator 130. Instead of being performed by a build server associated with client 110, static code analysis 438 and binary code analysis 440 may be performed by server 120 or hash validator 130. With build process 430, the (wall clock) time to complete a build is significantly reduced relative to build processes 400 and 420.

Embodiments are not limited to server 120 (or its related components, such as hash validator 130) performing static code analysis and binary code analysis. For example, such components may implement other parts of the build process, such as unit testing and/or integration testing. Also, additional tests may be performed on the source code or the binary code, such as "fuzzing" and performance testing (both examples of post-compilation activities), due to the time savings of performing code signing in this manner. Such additional tests/analysis might not have been performed previously due to the length of time required for a typical build and including a code signing step. Such additional tests/analysis may be performed while still keeping the overall time to complete a build to less than the time to complete a build using build process 400, which did not involve any code signing.

Fuzzing (or "fuzz testing") is an automated software testing technique that involves providing invalid, unexpected, or random data as inputs to a computer program. The computer program is then monitored for exceptions, such as crashes, failing built-in code assertions, or potential memory leaks.

Build process 430 adds additional security relative to build process 420. Before build process 430, an attacker only needed authentication credentials and authorization to use the selected private key. Now, with build process 430, an attacker also needs to submit a malicious payload to the source code repository and bypass one or more automated analysis tools, both of which are extremely difficult. For example, every access to the source code repository is tracked, making it extremely likely to detect the submission of a malicious payload to the source code repository.

Bill of Materials (BOM)

The concept of a bill of materials (BOM) is well-established in traditional manufacturing as part of supply chain management. A manufacturer uses a BOM to track the parts it uses to create a product. If defects are later found in a specific part, then the BOM is used to locate affected products.

In the electronic data context, a BOM is a list of components of a set of digital data. Examples of a set of digital data include a document, a video, an image, source code, executable code, and any combination thereof. As a specific example, the set of digital data is a Portable Document Format (PDF) document that includes a word processing document (a first component), three image files (second, third, and fourth components), and a video file (a fifth component). Each document or file that is part of this PDF document is considered a sub-document or file of the PDF document. A BOM for the PDF document may include a name and description of the word processing document, a name and description of each image file, and a name and description of the video file. Thus, a document upon which a BOM is generated may comprise (a) data/files of different types and/or (b) data of the same type (e.g., video) but in different formats (e.g., .mp4, .mov, .wmv).

As another example, a set of digital data is source code that comprises multiple files. A software BOM (or SBOM) for the source code may include a name and description of each file. Thus, a SBOM is a list of components in a piece of software. Software vendors often create products by assembling open source and commercial software components. The SBOM describes the components in a product and is analogous to a list of ingredients on food packaging. Therefore, some components listed in an SBOM may be open source components/files while other components listed in the SBOM may be proprietary components/files.

An SBOM is useful both to the builder (manufacturer) and the buyer (customer) of a software product. Builders may leverage available open source and third-party software components to create a product. An SBOM allows the builder to make sure that those components are up-to-date and to respond quickly to new vulnerabilities. Buyers may use a SBOM to perform vulnerability or license analysis, both of which can be used to evaluate risk in a product. Understanding the supply chain of software, obtaining a SBOM and using it to analyze known vulnerabilities may be crucial in managing risk.

BOM Generation

In an embodiment, a BOM (e.g., a SBOM) is generated during hash validation. For example, in response to retrieving a set of data (e.g., whether a document or source code), a BOM for the set of data may be generated. BOM generation may occur before, after, or during hash validation. Hash validation includes generating a hash based on the retrieved set of data, comparing the hash to the hash included in the signature request that triggered the retrieval of the set of data, and digitally signing the hash. Thus, BOM generation may begin immediately before or after the hash is generated, immediately before or after the two hashes are compared, or immediately before or after the hash is digitally signed.

Different components of system 100 may perform BOM generation, such as server 120, hash validator 130, or another computing device/system (not depicted in FIG. 1). Whichever component performs BOM generation has access to data repository 140 or at least to the data that was retrieved from data repository 140 in order to generate the second hash.

Digitally Signing a BOM

In an embodiment, a BOM is digitally signed as well as a corresponding hash (that may or not have been validated at that time). (A "corresponding hash" is a hash that is based on the same data for which the BOM is generated. Similarly, a "corresponding BOM," or a BOM that corresponds to a hash, is a BOM that is generated based on data from which the hash was generated.) For example, once generated, a BOM is transmitted to cryptographic device 150, which digitally signs the BOM using a cryptographic key. A BOM and a corresponding hash (received in a signature request) may be transmitted to cryptographic device 150 at the same time (i.e., in the same cryptographic request from, e.g., server 120) or at different times. Digitally signing a BOM allows a receiver of the BOM to validate the BOM based on a corresponding key.

Thus, in an embodiment, a BOM may be digitally signed as soon as the BOM is generated. Similarly, a hash may be digitally signed as soon as the hash is validated. Therefore, in some cases, a BOM is digitally signed before the corresponding hash and, in other cases, a hash is digitally signed before the corresponding BOM.

In another embodiment, digitally signing a hash is delayed until a corresponding BOM is also generated. Thereafter, the BOM and the hash are both transmitted to cryptographic device 150 for digital signing. Similarly, digitally signing a BOM is delayed until a corresponding hash is validated. Once the hash is validated, the BOM and the hash are both transmitted to cryptographic device 150 for digital signing.

In one embodiment, a single cryptographic key is used to digitally sign a hash and a corresponding BOM. In this embodiment, a signature request that includes a hash also includes a name or identifier of single cryptographic key.

In another embodiment, different cryptographic keys are used to digitally sign a hash and a corresponding BOM. In this embodiment, a signature request that includes a hash also includes two names/identifiers, each of a different cryptographic key.

Associating a BOM with the Corresponding Data

In an embodiment, if a BOM is generated based on data that is retrieved from data repository 140, then the BOM is associated with that data. One way in which to associate a BOM with its corresponding data is to store the corresponding hash of the data in the BOM. For example, server 120 stores a hash (that it receives in a signature request) in a BOM file that was generated based on data upon which the hash is allegedly based.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
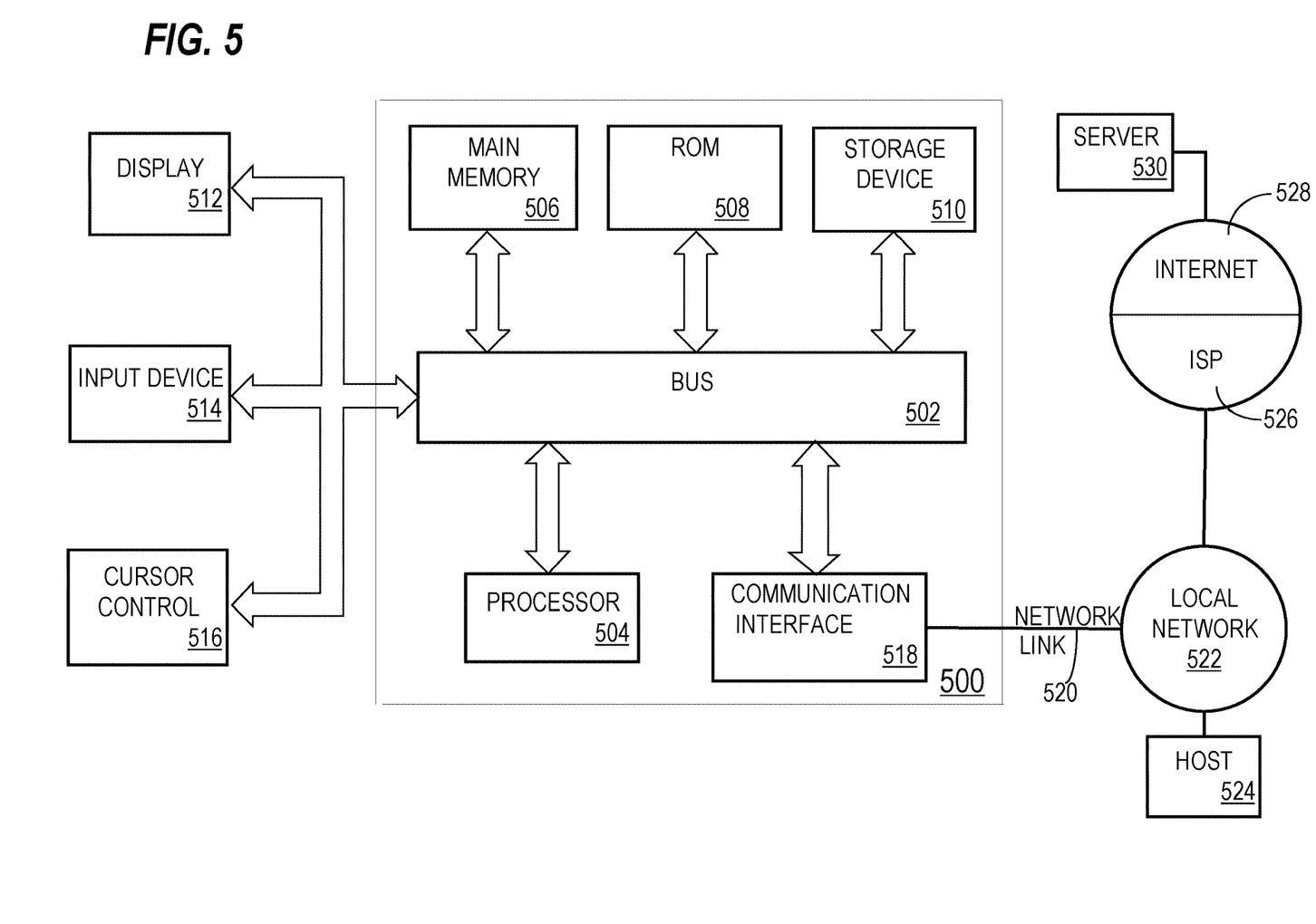
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving, from a client, a signature request that includes a first hash and a data identifier;
   in response to receiving the signature request:
   identifying the data identifier;
   sending the data identifier to a data repository;
   receiving, from the data repository, data that is associated with the data identifier;
   while performing one or more of a plurality of hash validation operations with respect to the first hash, performing, on the data, one or more operations that are separate from the plurality of hash validation operations;
   wherein the plurality of hash validation operations include:
   generating a second hash based on the data, and determining whether the second hash matches the first hash;
   wherein the method is performed by one or more computing devices.

2. The method of claim 1, wherein the data is source code, wherein the one or more operations are one or more compilation-related operations.

3. The method of claim 2, wherein the compilation-related operations include static code analysis on the source code, binary code analysis on a compiled version of the source code, unit testing, integration testing, validation testing, system testing, performance testing, or fuzzing.

4. The method of claim 2, further comprising:
   completing a build process only if results of the one or more compilation-related operations indicate no significant errors.

5. The method of claim 2, wherein the one or more compilation-related operations are one or more first compilation-related operations, the method further comprising:
   while performing, the one or more first compilation-related operations, performing, with respect to the source code or a compiled version of the source code, one or more second compilation-related operations that are different than the one or more first compilation-related operations.

6. A method comprising:
   receiving, from a client, a signature request that includes a first hash and a data identifier;
   in response to receiving the signature request:
   identifying the data identifier;
   sending the data identifier to a data repository;
   receiving, from the data repository, data that is associated with the data identifier;
   generating a second hash based on the data;
   determining whether the second hash matches the first hash;
   generating a bill of materials (BOM) document based on the data.

7. The method of claim 6, wherein the data is source code that comprises a plurality of files, wherein the BOM document identifies each file in the plurality of files.

8. The method of claim 6, wherein the data is a document, wherein the BOM document identifies sub-documents of the document.

9. The method of claim 8, wherein the sub-documents are a set of files and the BOM document includes a name for each file in the set of files.

10. The method of claim 9, wherein the set of files includes a first file of a first type and a second file of a second type that is different than the first type.

11. The method of claim 6, further comprising:
    causing a digital signature to be generated based on the BOM document.

12. The method of claim 11, wherein the digital signature is a first digital signature that is generated using a first cryptographic key, further comprising:
   causing a second digital signature to be generated based on the first hash using a second cryptographic key that is different than the first cryptographic key.

13. The method of claim 6, further comprising:
storing the first hash in the BOM.

14. The method of claim 6, further comprising:
   in response to determining that the second hash matches the first hash, sending the first hash to a cryptographic device that stores a private key;
   wherein the cryptographic device generates a digital signature based on the first hash and the private key;
   after sending the first hash to the cryptographic device, receiving the digital signature from the cryptographic device;
   in response to receiving the digital signature from the cryptographic device, sending the digital signature to the client.

15. The method of claim 6, wherein:
the signature request is received at a server;
sending the data identifier to the data repository comprises:
   sending the data identifier from the server to a hash validator that is separate from the server;
   sending, from the hash validator, to the data repository, the data identifier;
receiving the data from the data repository comprises receiving the data at the hash validator;
generating the second hash comprises generating the second hash by the hash validator;
the method further comprising receiving the second hash from the hash validator at the server.

16. The method of claim 6, further comprising, prior to generating the second hash:
   sending the first hash to a cryptographic device that stores a private key;
   wherein the cryptographic device generates a digital signature based on the first hash and the private key;
   after sending the first hash to the cryptographic device, receiving the digital signature from the cryptographic device;
   in response to receiving the digital signature from the cryptographic device, sending the digital signature to the client.

17. The method of claim 16, further comprising:
   after sending the digital signature to the client, determining that the second hash does not match the first hash;
   in response to determining that the second hash does not match the first hash, causing performance of one or more security audit activities.

18. The method of claim 17, wherein the one or more security audit activities includes sending one or more notifications to one or more recipients.

19. The method of claim 15, further comprising:
   performing, by the server, one or more compilation-related operations that include static code analysis on source code, binary code analysis on a compiled version of the source code, unit testing, integration testing, validation testing, system testing, performance testing, or fuzzing.

20. One or more non-transitory storage media storing instructions which, when executed by the one or more processors, cause performance of the method recited in claim 1.

* * * * *